Feb. 8, 1927.  
J. G. JONES ET AL  
1,616,973  
AUTOMATIC PHOTOGRAPHIC FILM SPOOL MAKING MACHINE  
Filed April 4, 1925  11 Sheets-Sheet 1
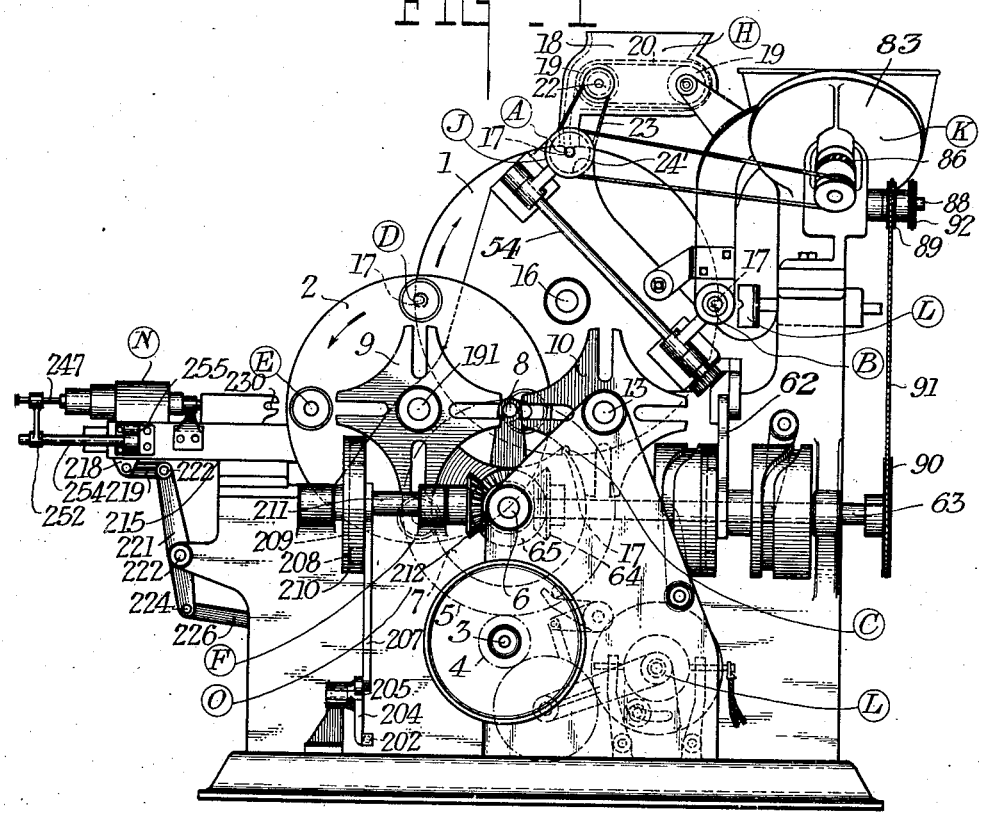
FIG_1
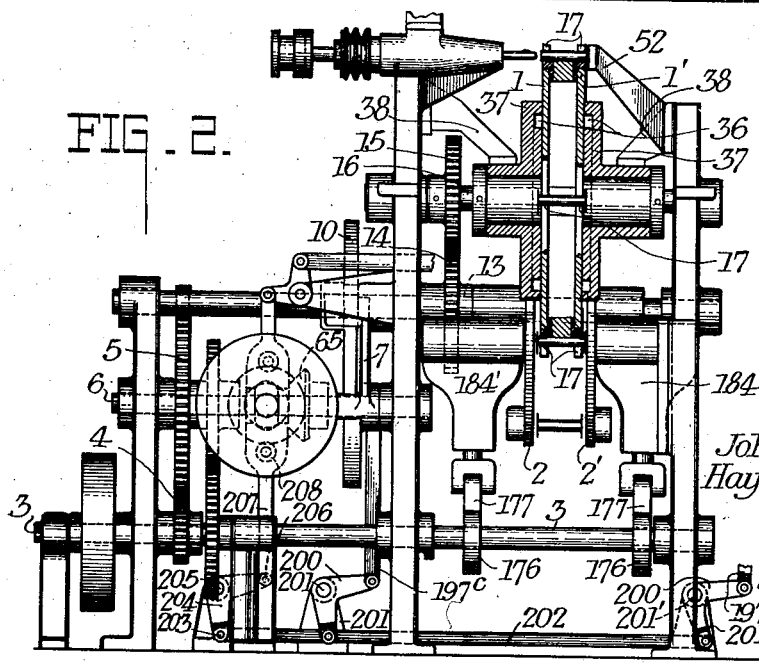
FIG_2
John G. Jones and  
Haywood G. Dewey,  
INVENTORS;  
ATTORNEYS.

Feb. 8, 1927. 1,616,973
J. G. JONES ET AL
AUTOMATIC PHOTOGRAPHIC FILM SPOOL MAKING MACHINE
Filed April 4, 1925 11 Sheets-Sheet 2
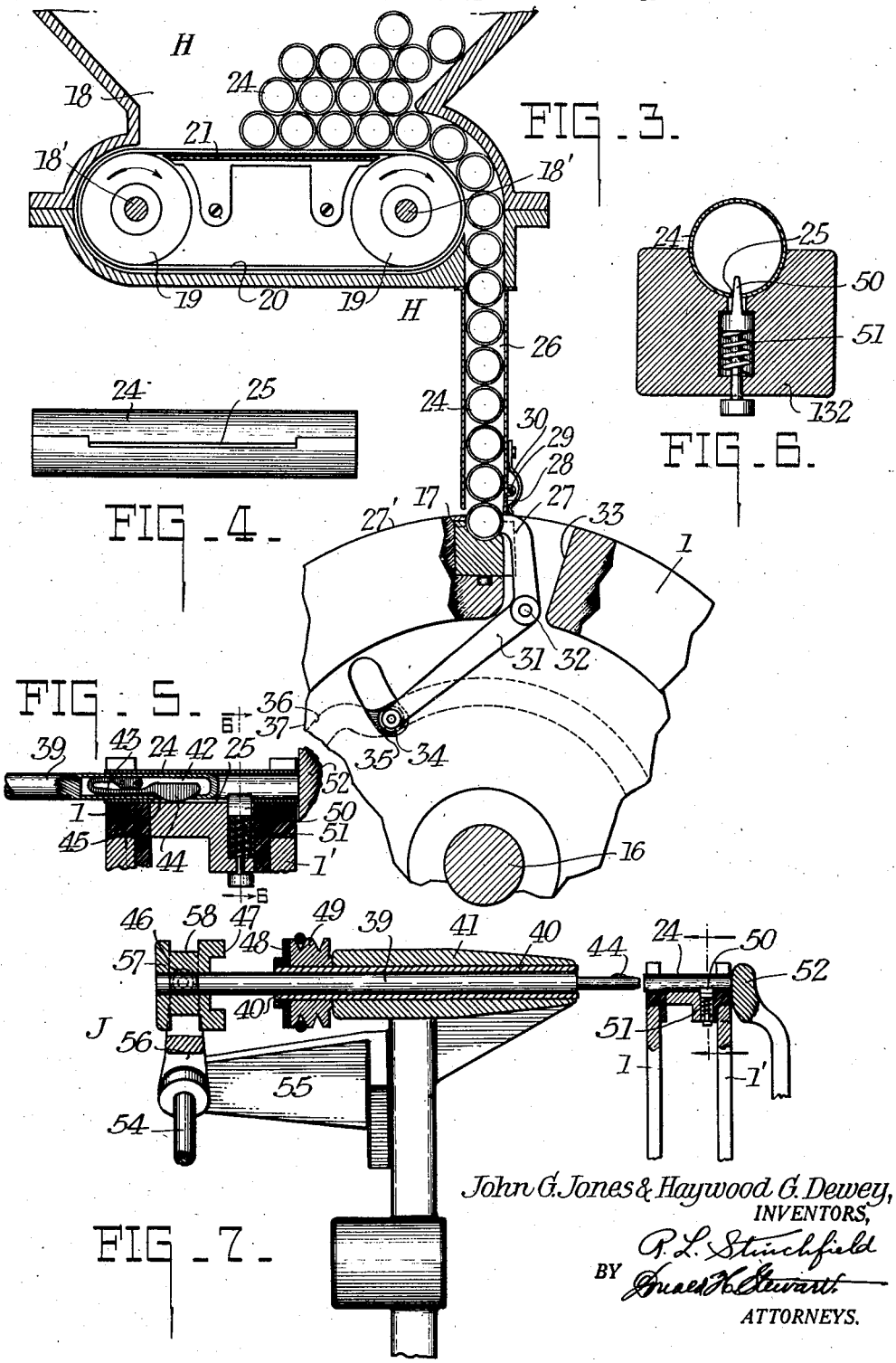
John G. Jones & Haywood G. Dewey,
INVENTORS,
BY
ATTORNEYS.

Feb. 8, 1927.
J. G. JONES ET AL
1,616,973
AUTOMATIC PHOTOGRAPHIC FILM SPOOL MAKING MACHINE
Filed April 4, 1925   11 Sheets-Sheet 3
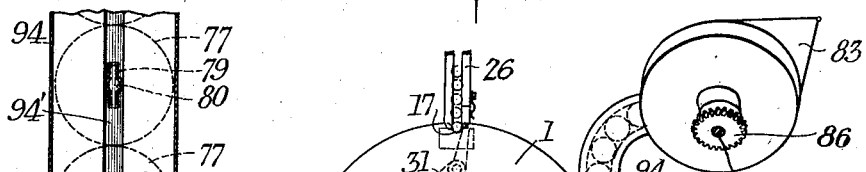
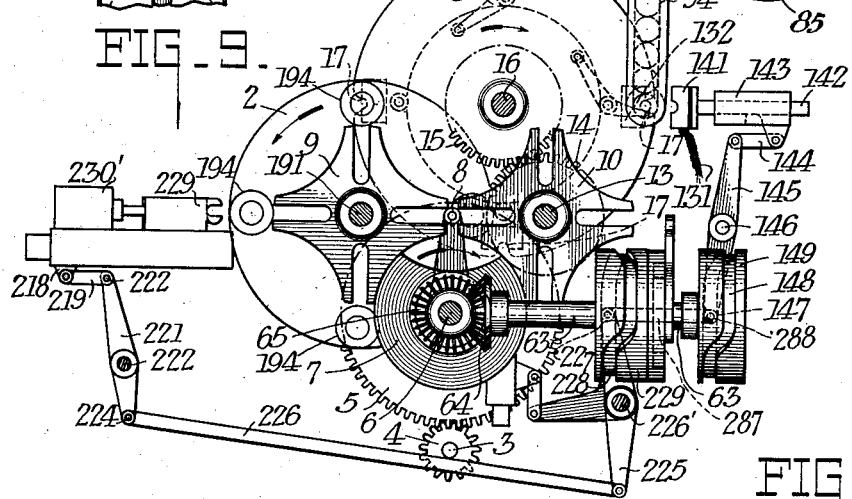
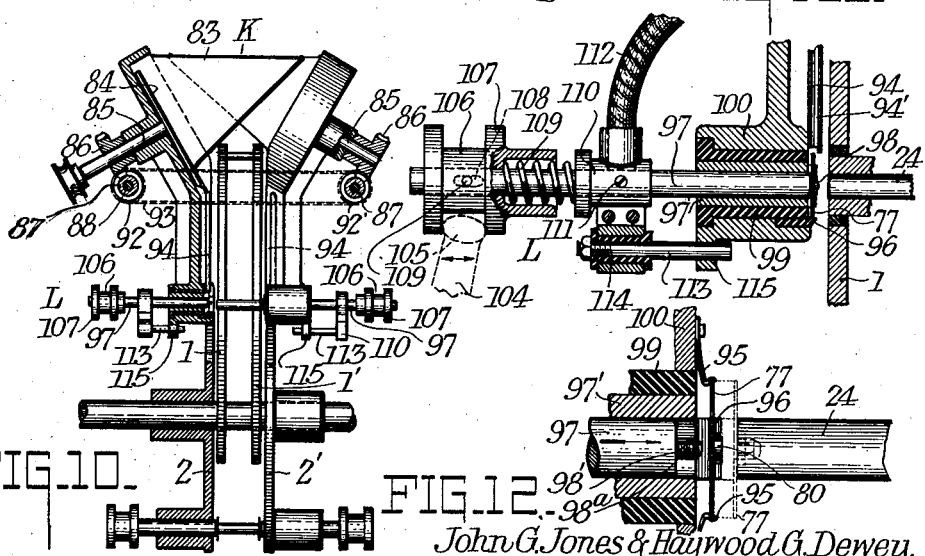
John G. Jones & Haywood G. Dewey,
INVENTORS,
BY R. L. Stinchfield
Donald H. Stewart.
ATTORNEYS.

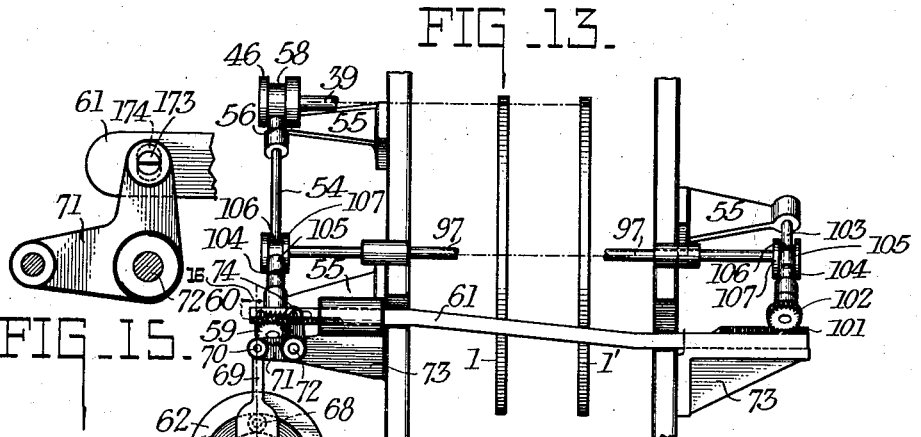
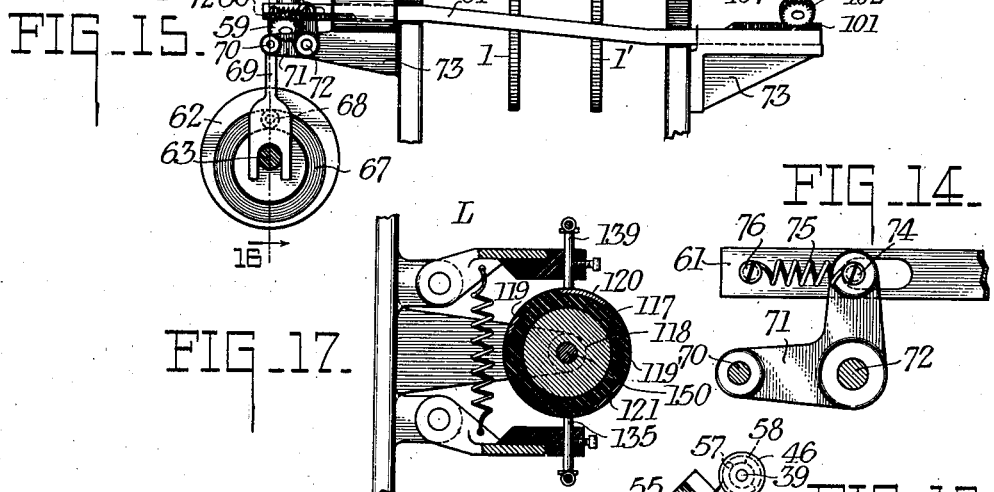
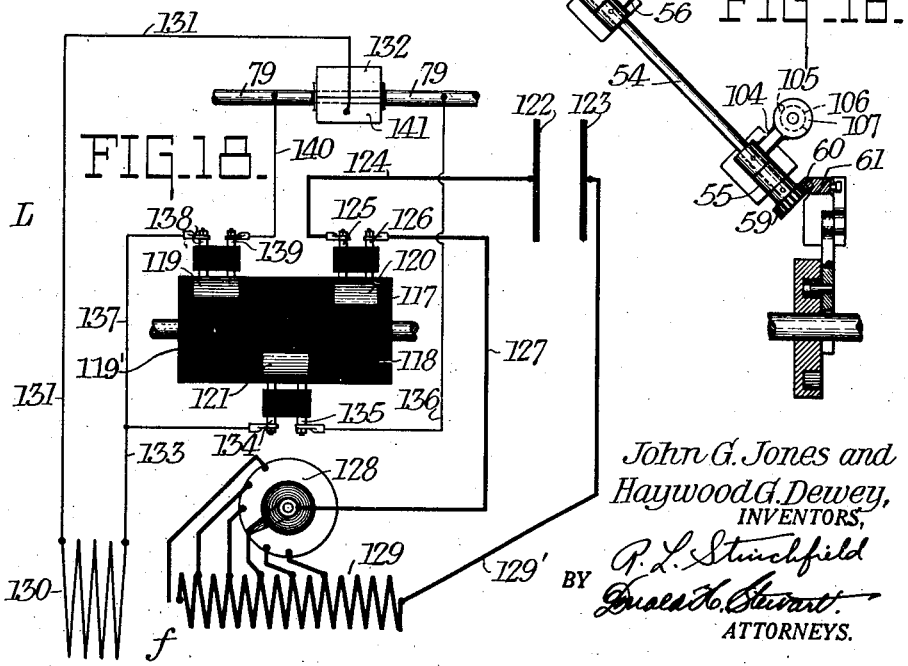

Feb. 8, 1927. 1,616,973
J. G. JONES ET AL
AUTOMATIC PHOTOGRAPHIC FILM SPOOL MAKING MACHINE
Filed April 4, 1925    11 Sheets-Sheet 5
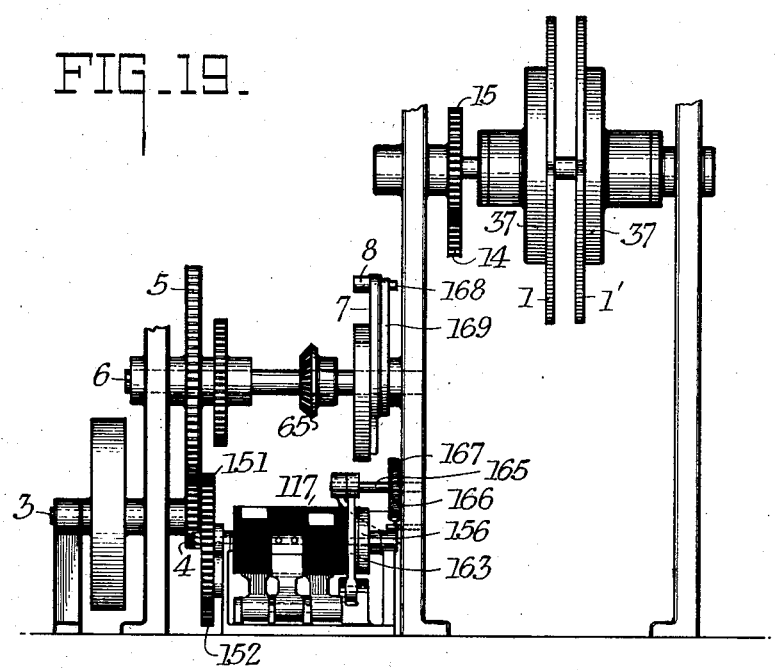
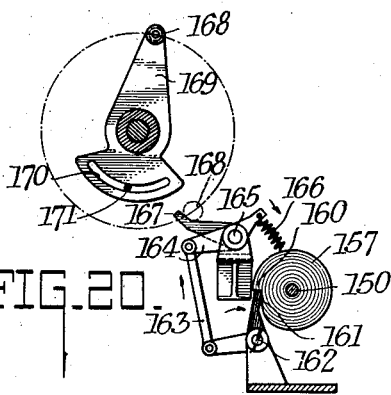
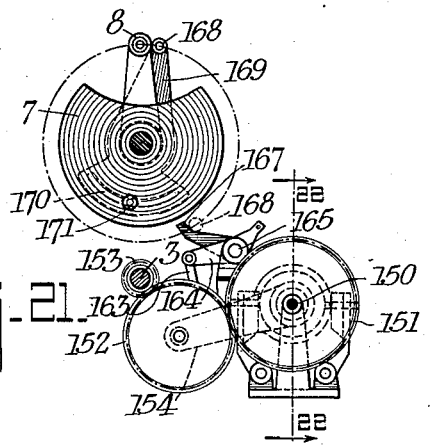
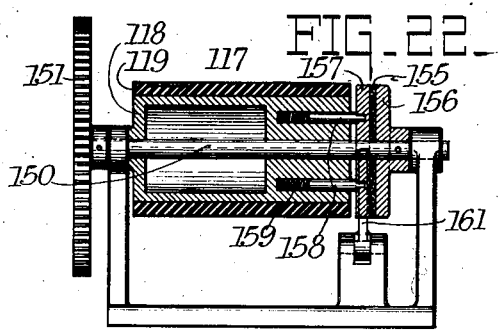
John G. Jones &
Haywood G. Dewey,
INVENTORS;
BY
ATTORNEYS.

Feb. 8, 1927.
J. G. JONES ET AL
1,616,973
AUTOMATIC PHOTOGRAPHIC FILM SPOOL MAKING MACHINE
Filed April 4, 1925    11 Sheets-Sheet 6
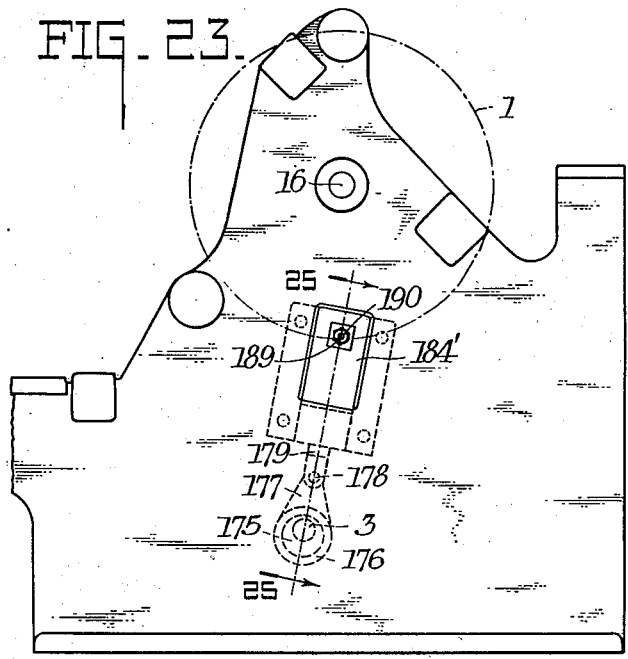
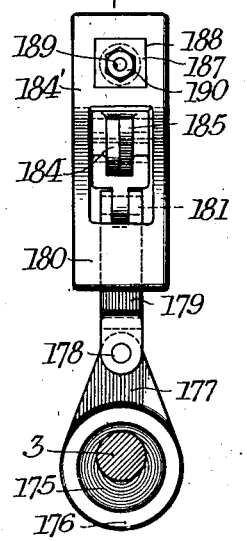
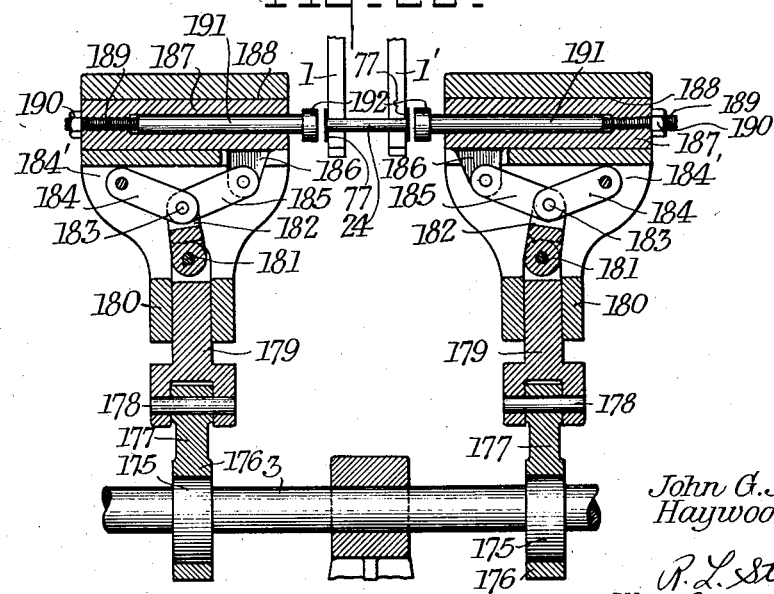
John G. Jones and
Haywood G. Dewey,
INVENTORS,
BY R. L. Stinchfield
ATTORNEYS.

Feb. 8, 1927. 1,616,973
J. G. JONES ET AL
AUTOMATIC PHOTOGRAPHIC FILM SPOOL MAKING MACHINE
Filed April 4, 1925 11 Sheets-Sheet 7
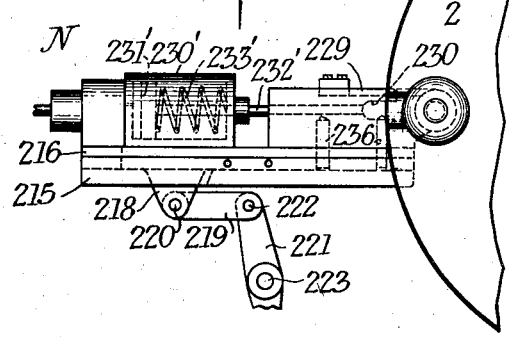
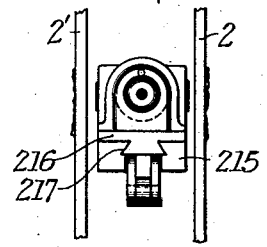
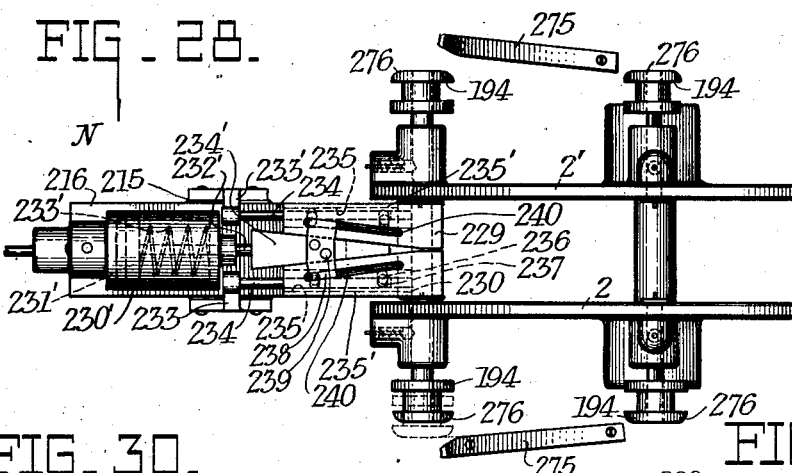
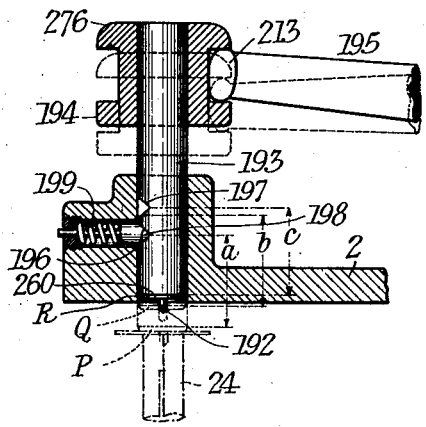
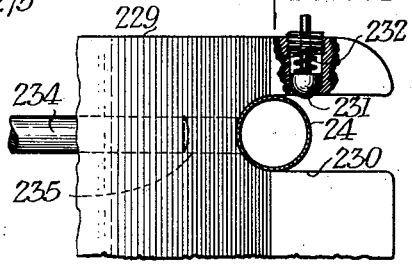
John G. Jones and
Haywood G. Dewey,
INVENTORS;
BY R. L. Stutchfield
Donald H. Stewart
ATTORNEYS.

Feb. 8, 1927. 1,616,973
J. G. JONES ET AL
AUTOMATIC PHOTOGRAPHIC FILM SPOOL MAKING MACHINE
Filed April 4, 1925 11 Sheets-Sheet 8
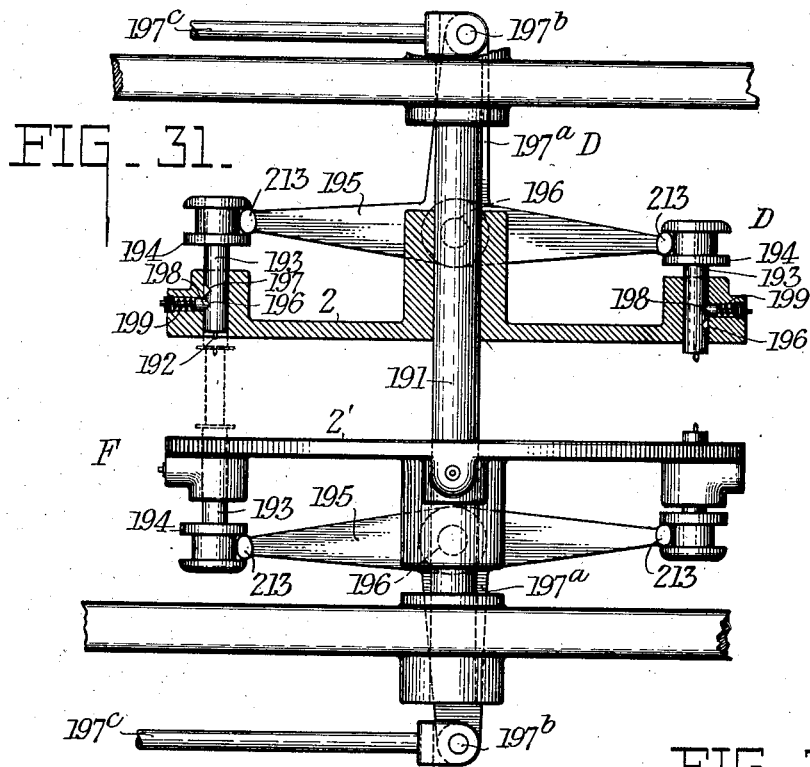
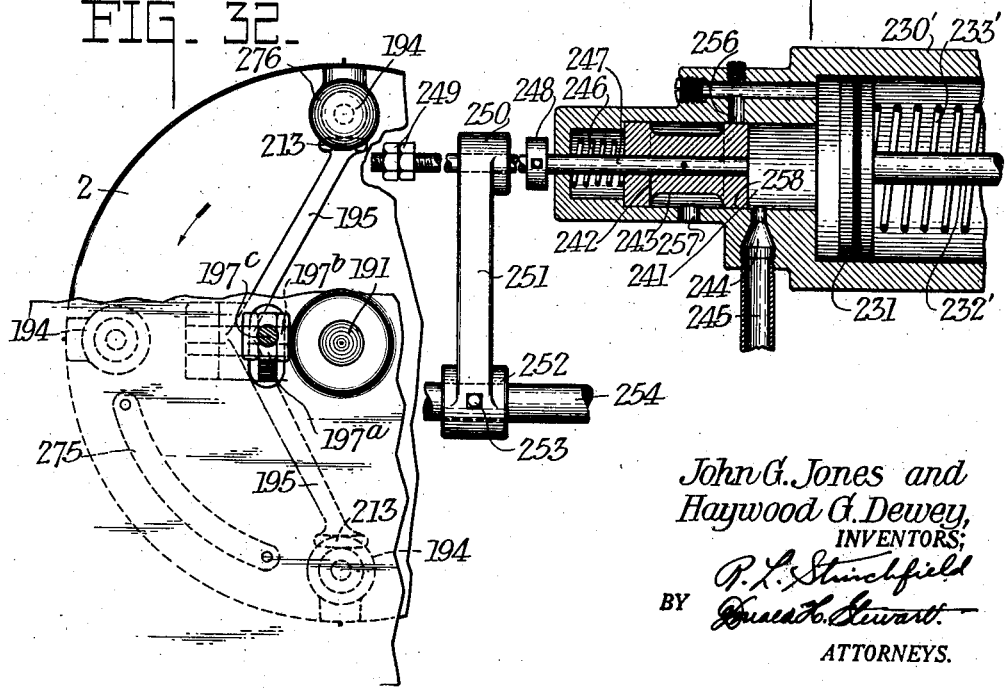
John G. Jones and
Haywood G. Dewey,
INVENTORS;
BY
ATTORNEYS.

Feb. 8, 1927. 1,616,973
J. G. JONES ET AL
AUTOMATIC PHOTOGRAPHIC FILM SPOOL MAKING MACHINE
Filed April 4, 1925   11 Sheets-Sheet 9

John G. Jones and
Haywood G. Dewey,
INVENTORS,

BY
ATTORNEYS.

Feb. 8, 1927. 1,616,973
J. G. JONES ET AL
AUTOMATIC PHOTOGRAPHIC FILM SPOOL MAKING MACHINE
Filed April 4, 1925   11 Sheets-Sheet 10
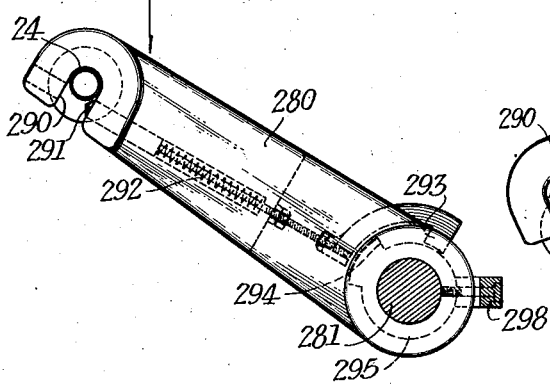
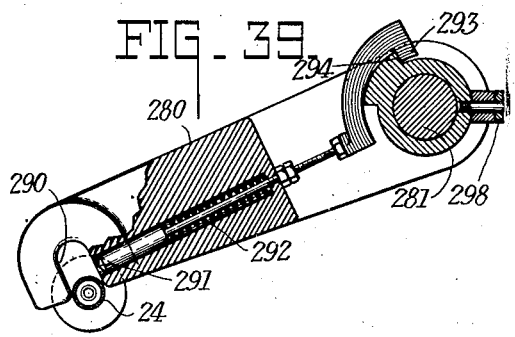
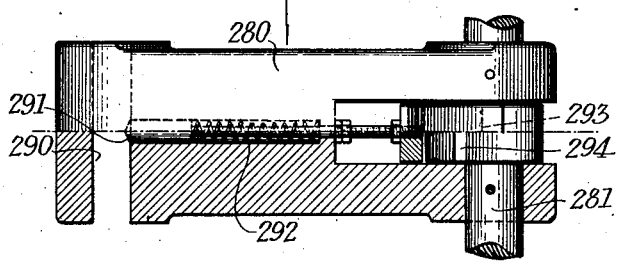
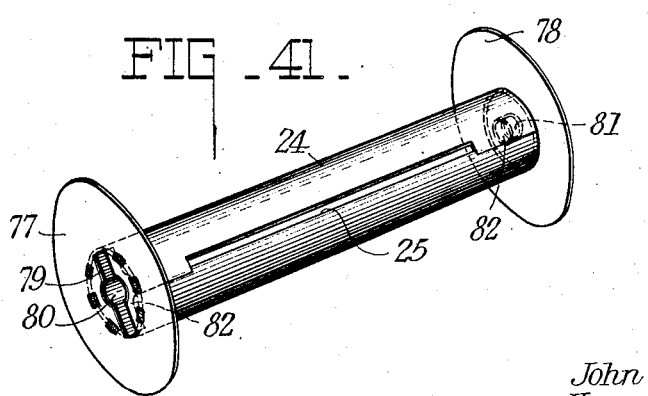
John G. Jones and
Haywood G. Dewey
INVENTORS;
BY
ATTORNEYS.

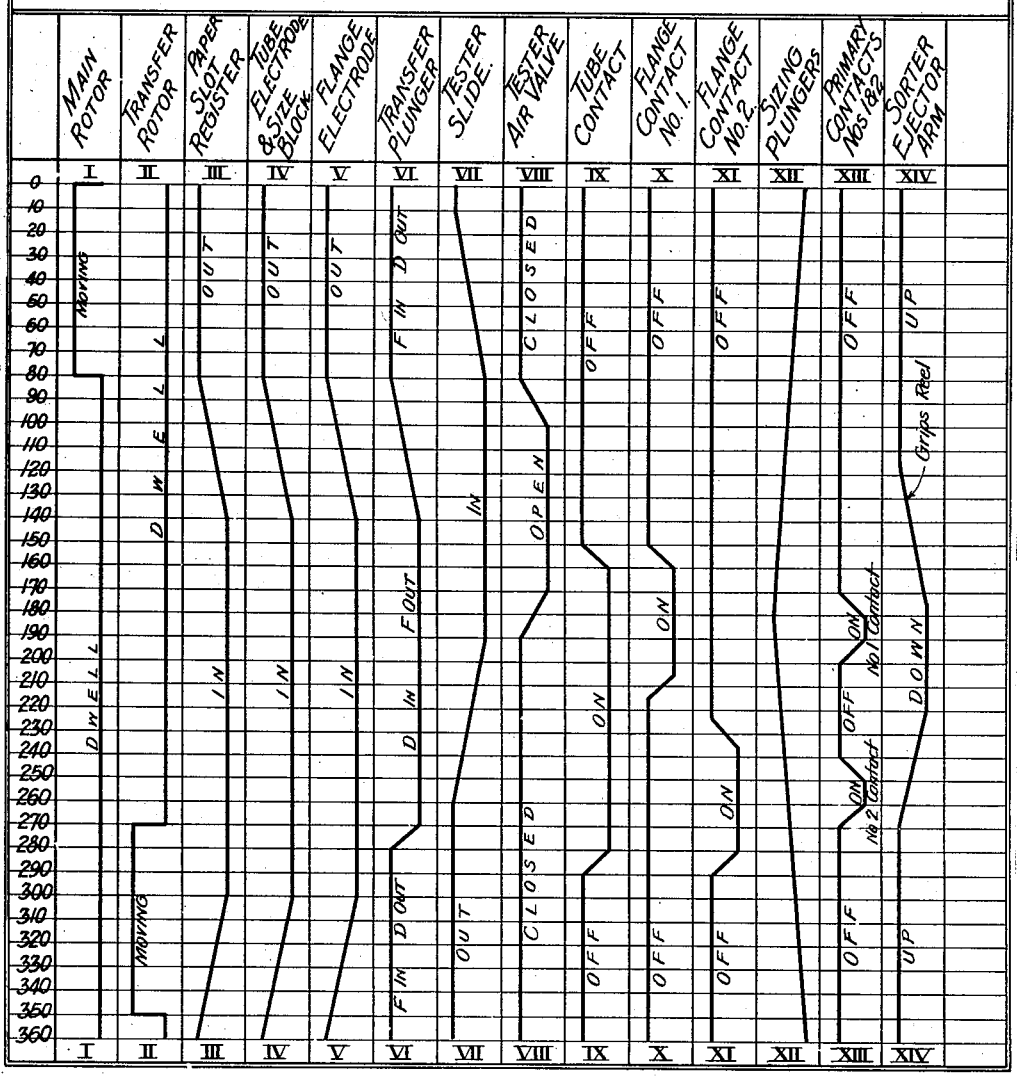

Patented Feb. 8, 1927.

1,616,973

UNITED STATES PATENT OFFICE.

JOHN G. JONES AND HAYWOOD G. DEWEY, OF ROCHESTER, NEW YORK, ASSIGNORS TO EASTMAN KODAK COMPANY, OF ROCHESTER, NEW YORK, A CORPORATION OF NEW YORK.

AUTOMATIC PHOTOGRAPHIC-FILM-SPOOL-MAKING MACHINE.

Application filed April 4, 1925. Serial No. 20,723.

This invention relates to machines for automatically making all metal spools particularly adapted for spooling photographic film. One object of our invention is to make a machine which will assemble the spool core and flanges together without attention from an operator. Another object is to provide a machine which will assemble the flanges and core together with a definite relation to each other so that a slot in a flange will always bear a definite relation to a slot in the core to facilitate the spooling operations. Another object is to provide a machine in which the flanges are spot welded upon the core. Another object is to provide a machine in which the flanges so attached will be definitely spaced one from the other. Another object of our invention is to provide a machine in which the strength of the welded flanges are tested, and the defective spools are discarded. Another object of our invention is to automatically remove the defective spools from the machine. Another object is to automatically identify all spools defective because of improper dimensions or defective welding and separate these spools from the good spools. Another object is to provide a machine with an "upsetting" mechanism adapted to size spools which have been previously welded together, and other objects will appear from the following specification, the novel features being pointed out in the claims at the end thereof.

In making spools for carrying photographic film it is necessary for best results to provide flanges which are parallel, which have square corners with the flange to which they are attached, which have the peripheries concentric, and which have a firm connection with the core so that they can not be readily displaced therefrom. The film and film backing paper to run smoothly on the core between the flanges must have a smooth surface to contact with, and one that is free from protuberances or indentations except for the slot through which the end of the lead strip may pass in threading the film to a take-up spool in the camera.

With our machine we have provided means for adjusting the machines so that spools with the allowable or desired tolerances may be automatically made and separated from spools which are defective in that they do not come within the tolerances for which the machine has been previously set. After once adjusting the machine for a predetermined allowable tolerance no further attention on the part of the operator is necessary.

Coming now to the drawings wherein like reference characters denote like parts throughout:

Fig. 1 is a side elevation of a machine constructed in accordance with and illustrating one embodiment of our invention, certain parts being omitted for clearness;

Fig. 2 is an end elevation of the machine shown in Fig. 1, certain parts being in section and certain parts being omitted for clearness;

Fig. 3 is a fragmentary detail section showing the mechanism which feeds the spool cores to the main rotor;

Fig. 4 is a plan view of a spool core;

Fig. 5 is a fragmentary detail section of the spool core righting mechanism;

Fig. 6 is a detail section on line 6—6 of Fig. 5;

Fig. 7 is a fragmentary sectional view of the spool core righting mechanism, and the driving mechanism therefor;

Fig. 8 is a fragmentary side elevation of a portion of the machine driving mechanism;

Fig. 9 is a detail sectional view of a portion of the spool flange chute;

Fig. 10 is a part end elevation and part section showing a flange applying and spot welding station;

Fig. 11 is an enlarged sectional detail of the spot welding station;

Fig. 12 is an enlarged detail in section showing the flange holding and applying mechanism;

Figs. 12$^A$ and 12$^B$ are fragmentary perspective details of the flange engaging parts of the electrodes.

Figure 34:
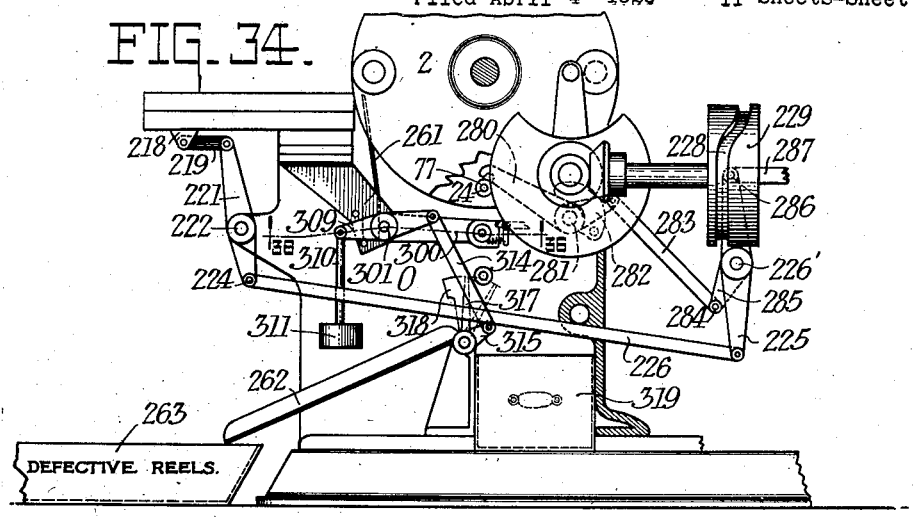
Figure 35:
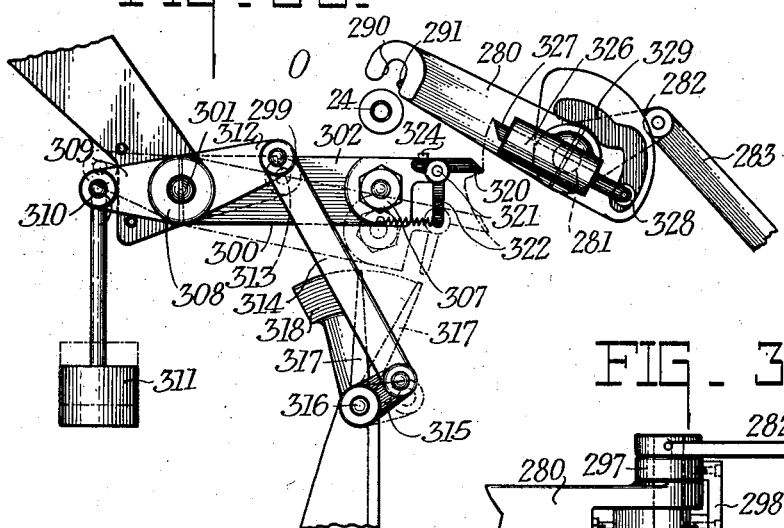
Figure 37:
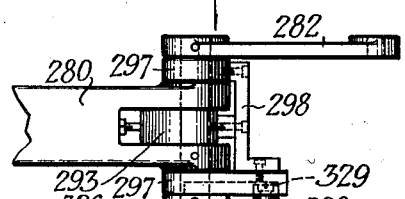
Figure 36:
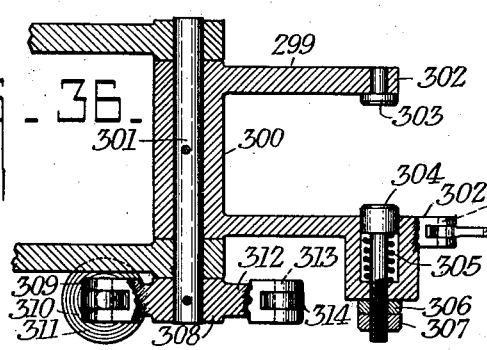

Fig. 13 is a fragmentary end view of the operating mechanism for the spool core righting member and the spot welding and flange applying mechanisms;

Fig. 14 is a detail of a resilient drive for the mechanism above described;

Fig. 15 is a modified form of driving mechanism which may be used in place of the device shown in Fig. 14;

Fig. 16 is a section on line 16—16 of Fig. 13, showing a part side elevation and part section of the driving mechanism shown in Fig. 13;

Fig. 17 is a section through the rotary switch used to control the current for spot welding;

Fig. 18 shows a plan view of the rotary switch shown in Fig. 17 together with a wiring diagram;

Fig. 19 is a fragmentary end elevation of our machine showing the location of and the driving mechanism for the rotary switch;

Fig. 20 is a fragmentary side elevation of the switch controlling mechanism;

Fig. 21 is a fragmentary side elevation of the switch driving mechanism;

Fig. 22 is a section on line 22—22 of Fig. 21;

Fig. 23 is a side elevation of a portion of the machine showing the location of the upsetting mechanism;

Fig. 24 is an end elevation of the upsetting mechanism;

Fig. 25 is a sectional view through the upsetting mechanism being taken on line 25—25 of Fig. 23;

Fig. 26 is a fragmentary side elevation of the spool testing mechanism;

Fig. 27 is a fragmentary end elevation of the same mechanism;

Fig. 28 is a plan view of the spool testing mechanism;

Fig. 29 is an enlarged detail showing the spool holding device used in connection with the spool testing mechanism;

Fig. 30 is an enlarged detail showing one of the holding members;

Fig. 31 is a part section and part elevation of the second rotor together with its spool holding members and the operating arms therefor;

Fig. 32 is a fragmentary end elevation of the device shown in Fig. 31;

Fig. 33 is an enlarged detail showing in section the air valve used in connection with the spool testing mechanism;

Fig. 34 is a fragmentary side elevation partly in section showing the sorting mechanism;

Fig. 35 is an enlarged detail showing the structure of the spool sorting mechanism;

Fig. 36 is an enlarged sectional detail on line 36—36 of Fig. 34;

Fig. 37 is a plan view of the spool carrying arm used at the spool sorting station;

Fig. 38 is an enlarged view showing the spool carrying arm in detail;

Fig. 39 is an enlarged sectional view of the spool carrying arm in its spool releasing position;

Fig. 40 shows the spool carrying arm partly in section and partly in elevation;

Fig. 41 is a perspective view of a completed film spool; and

Fig. 42 is a timing chart illustrating the relative movements of the cams, rotors and other movable parts.

A brief description of our machine is as follows: a main rotor 1 carries a spool core from a loading and righting station A to a flange applying station B, after which the spool is carried to an upsetting or sizing station C. The spool is then carried to station D where a second rotor 2 picks the spool from rotor 1 and carries it to station E when the spool is tested for the strength of the weld. From station E it is moved to station F where the spool is sized and sorted.

The spool core feeding mechanism is designated broadly as H, the core righting mechanism as J, the flange feeding mechanism as K, the spot welding mechanism as L, the upsetting mechanism as M, the testing mechanism as N, and the sorting mechanism as O.

The main rotor 1 is intermittently actuated from a power driven shaft 3 through gears 4 and 5, the latter driving shaft 6 upon which there is located a Geneva driver 7, the roller 8 of which is positioned to drive two Geneva star wheels 9 and 10, and by permitting the roller to enter the Geneva slots 11 and 12 at an angle, a dwell is obtained between the movement of the two Genevas. Geneva 10 through shaft 13, gears 14 and 15 and shaft 16 moves the main rotor 1. (See Figs. 1 and 2.)

Rotor 1 consists of a pair of spaced plates 1 and 1' having notches 17 spaced about its periphery at 90°. Geneva 10 moves the rotor a quarter of a complete revolution each time it is actuated by the driving member. The second rotor 2 also consists of pairs of spaced plates 2 and 2' which are spaced to extend outside of the main rotor plates 1 and 1'. The second rotor is actuated by Geneva star wheel 9 which, as shown in columns I and II of the time chart (Fig. 42) drives the rotors at different time intervals with a short period of rest (here shown as 10°) between the movement of the two rotors. The second rotor is called the transfer rotor.

The various stations and the functions performed at the stations will now be described.

Station A, the core supplying station preferably comprises a core supply chamber 18, as best shown in Fig. 3. This supports shafts 18', and rollers 19 over which an endless belt 20 passes. A table 21 supports the central portion of the belt. A roller 19 is driven through pulley 22, belt 23 and pulley 24' which derives power in a manner to be hereinafter described. In Fig. 1 a modified core supply station is shown, this being arranged so as to lie as close as possible to the flange loading hoppers to be hereinafter described. In Fig. 3 the only difference is in the position of the hopper 18. The spool cores, as shown in Fig. 4 are preferably metallic cylinders 24 having a slot 25 in one side. These are fed by the belt into a chute 26 and when a pair of notches 17 are moved beneath chute 26, the lowermost core will drop into the notches where a holding finger 27 will contact with it. A flap 28, hinged at 29 to the chute 26 and pressed by spring 30 toward the full line position Fig. 2 permits the rotor 1 to carry one core away, the remaining lowermost core lying on the periphery 27′ of the rotor wheels.

The holding finger 27 is one end of a bell crank 31 pivoted at 32 to a rotor disc 1 operating in a cut-out 33 in the disc.

The other end 34 carries a roller 35 lying in the cam slot 36 of cam 37. A holding finger and cam are provided for each disc 1 and 1′, and, as best shown in Fig. 2, cams 37, do not move with shaft 16 but are affixed to the main upright frame members through brackets 38.

Before the spool core is moved however, the slot is positioned so that it will lie, in this instance toward the hub of the rotor. This is necessary because we prefer to have the core slot 25 in a definite relation to the flange slot, since this facilitates spooling in the automatic film spooling machine, such as is shown in Patent No. 1,532,753, of April 7, 1925, and in semi-automatic film spooling machine shown in Patent No. 1,560,167, of Nov. 3, 1925.

To "right" the core, that is to bring the slot in the desired position we use the mechanism designated broadly as J shown in Figs. 5 to 7 inclusive. We provide a shaft 39 mounted in a bearing 40 which is carried by the frame member 41. This shaft may both turn and slide in bearing 40. The end of the shaft is hollowed out at 42 and a spring 43 is mounted therein adapted to press a curved blade 44 through a slot 45 in the shaft. This blade forms a latch adapted to engage the spool slot 25 when the shaft 39 enters the core, but the shape is such that it may readily snap into and out of the slot.

Shaft 39 is revolved by the following clutch mechanism: a spool 46 is pinned to shaft 39 and carries a face 47 adapted to contact with the leather clutch face 48 of pulley 49. Pulley 49 is mounted on sleeve 40 and is free to turn thereon, but when shaft 39 is moved to the right, Fig. 7, the clutch is made and the shaft and pulley revolve together.

As shaft 39 revolves blade 44 snaps into slot 25 and turns core 24 turning it until detent 50 actuated by spring 51 snaps into the slot 25, at which time blade 44 snaps out and the spool core is properly positioned. When shaft 39 is moving into the core, the thrust on the core is taken up by the bracket 52, Figs. 2 and 7, and when drawn from the core the pull is taken up by detent 50, which as shown in Fig. 5, lies in the extreme end of slot 25. Thus the core is not displaced during the righting operation.

Shaft 39 is moved back and forth in the timed relation indicated in column III of the time chart, by the rock shaft 54. This shaft, supported by brackets 55 carries an arm 56, best shown in Fig. 16, which carries a yoke 57 embracing the slot 58 of spool 46. Shaft 54 carries a pinion 59 meshing with a rack 60 on arm 61, which, as best shown in Fig. 13, is moved through a cam 62 on the power driven shaft 63. This shaft through bevel gears 64 and 65 is driven from shaft 6 (Fig. 1). Cam 62 has a slot 67 in which roller 68 of lever 69 moves. This lever is pivoted at 70 to one end of a bell crank lever 71 pivoted at 72 to bracket 73 and carrying on the other end a pin 74 supporting a spring 75, the other end of which is attached to stud 76 of arm 61.

The core 24, properly positioned is now moved to station B to receive flanges from mechanism K and have them welded in place by mechanism L.

The flanges for each end of the core are fed by the same mechanism K, so that being similar, only one will be described in detail. The flanges 77 and 78 (Fig. 41) preferably differ in that flange 77 is provided with a slot 79 in the central part of which 80 is an aperture, whereas flange 78 is preferably provided with a central aperture only as at 81. If desired, however, the flanges may be exactly the same. We also prefer to form the edges of the slot and aperture inwardly so as to form a flange 82 since this forms a guiding flange for positioning the slot properly in our machine, and has certain advantages when used in the roll film cameras now on the market.

The flanges 77 are placed in a hopper 83 (Figs. 1, 8 and 10) and in this hopper is a disc 84 carried by shaft 85 operated through gears 86 and 87 from shaft 88. Shaft 88 through sprockets 89 and 90 and chain 91 is operated from power shaft 63. The two hopper discs may be driven together by means of sprockets 92 and 92′ which are connected together by chain 93, as indicated in broken lines Fig. 10.

Disc 84 is turned agitating flanges 77 and causing them to slide down chute 94 in which there is a groove 94′ which (Fig. 9) holds the slot flanges 79 in a fixed position. At the bottom of chute 94 are a pair of flange gripping spring arms 95 which position the flange while the bottom of the flange rests on the lug 96.

The flanges are each applied to the spools by means of sliding electrodes 97. One electrode has a pilot 98′ to which there are attached flanges 98ª which hold the flange slot 79 in the desired position. The other electrode has a pilot 98 which enters the central aperture 80. These electrodes are shown in Figs. 12^A and 12^B. As this electrode 97 slides to the right, Fig. 12, the flange is moved from its holding spring arms 95 from the position shown in full lines to the position shown in broken lines, in which it lies against the core 24 in position for welding.

The welding mechanism L includes the electrodes 97 as above described, and the following mechanism. Electrode 97 (each side is the same) slides in a sleeve 97' insulated by sleeve 99 from frame 100. Member 97 is actuated from the rock shaft 54 which is fully described as the operating means for the righting mechanism J. The electrode on the opposite side is moved through arm 61 (Fig. 13) rack 101, gear 102, shaft 103 and an arm 104. There is an arm 104 on each side of the machine.

Arm 104 has a yoke 105 (Fig. 16) embracing the slot 106 in spool 107. This spool has a slot 108 adapted to slide about a pin 109 carried by electrode 97. Spool 107 has a flange surrounding a part of spring 109 which presses the spool from the stop 110 attached to electrode 97 by a screw 111, this also forming the connecting member for the electric cable 112. A guide rod 113 insulated at 114 from member 110 by sliding in bearing 115 prevents electrode 97 from turning.

As will readily be seen the spool moves the electrode against the flange and into its welding position in which it is resiliently pressed by spring 109 until released by the rock shaft. The timed relation of this movement is shown in column IV of the timing chart.

After the flanges are placed by mechanism K the welding mechanism L is positioned and the spot welding operation takes place when the switch is actuated as will now be described: the switch itself is preferably of the rotary type, and, with its associated mechanism is shown in Figs. 17 to 22 inclusive.

The switch comprises a drum designated broadly at 117, this including a hub portion 118, an insulating sleeve 119' and contact members 119, 120 and 121. Referring to Fig. 18, the power is derived from the line wires 122 and 123 from one wire of which a wire 124 leads to brushes 125 and 126 and thence through wire 127 to rheostat 128 which is tapped off different coils of the primary 129 of the transformer f, wire 129' leading back to wire 123.

The secondary transformer coil 130 has one wire 131 leading to the copper block 132 which lies against one half of the spool to be welded, the other half of the block being shown in Fig. 8 as consisting of block 141 carried by shaft 142 slidable through bearing 143 by link 144 and rocker arm 145 pivoted at 146 to the frame and having a roller 147 engaging the slot 148 of cam 149 on power shaft 63. The other wire 133 leads from the secondary through brushes 134 and 135 and wire 136 to one electrode 79. The other electrode is connected to the secondary coil through wire 137 brushes 138 and 139 and wire 140.

The switch hub 118 turns freely upon a shaft 150, (Fig. 22) which is power driven through gears 151, 152 and 153 the last mentioned gear being mounted on the power shaft 3. Gear 152 is carried by an adjustable arm 154 and by selecting a gear of the desired size the speed of shaft 150 may be altered at will. A clutch face 155 is carried by disc 156 pinned to shaft 150 and this face 155 contacts with disc 157 carried by pins 158 spring pressed by springs 159 toward the clutch face.

Disc 157 turns freely upon shaft 150 and is notched at 160 to form a stop. A latch 161 (Figs. 20 and 21) pinned to shaft 162 is adapted to contact with the stop and may be actuated through link 163 and lever 164 pinned to shaft 165 and held by spring 166 in the direction indicated by the arrows. Shaft 165 carries a trip 167 in the path of the striker 168 which is adjustably carried on an arm 169 having a slot 170 and bolt connection at 171 with the Geneva driver 7. The roller 168 may be moved with respect to the roller 8 of the Geneva driver 7. At each revolution of roller 168 the trip is actuated and latch 161 permits clutch 155 to turn the rotary switch one revolution, after which latch 161 causes disc 157 to come to a stop. The location of the rotary switch is shown in Fig. 19.

It should be noted here that there are three main adjustments for the spot welding operation. First the voltage and amperage of the welding current may be varied by the rheostat, that is the taps on the primary transformer coil. Second the duration of the welding is controlled by changing the speed of the commutator or rotary switch. Third, the time at which the welding current is applied relative to the other functions of the machine may be varied by the adjustable trip (170—171) for the rotary switch. Of course, these adjustments are not necessarily altered after once made, but are desirable so that the welding conditions may be altered to take care of different metals from which the spools may be made and different welding requirements. One advantage is that if desired the welding may be adjusted to heat the flange and spool to such an extent that the next operation, the upsetting mechanism M may be performed while the metal is still hot. We do not limit ourselves or even prefer to upset the flanges in a heated condition as the advantages derived from such treatment depend chiefly upon the metal used. With some metals the sizing can be done to advantage when the metal is in an unheated condition.

It might also be noted here that if desired the arm 61 (which moves the electrodes) may have a non-resilient driving connection as shown in Fig. 15 where a modification of the connection shown in Fig. 14 is shown. In Fig. 15 bell crank lever 71 carries a stud 173 which enters slot 174 in arm 61. The machine may depend upon the electrode spring 109 or the driving spring 75 or both to obtain the desired resiliency.

From station B the welded spool is moved to station C where the film spool is upset, or sized. This is accomplished by the mechanism M, shown in Figs. 23 to 25 inclusive. As the spools formed in the machine have the flanges spaced by blocks of fixed length (143 and 141) the natural tendency in case of inaccurate welding is for the spool flanges to be spaced too far apart. To overcome this we upset the flanges to drive them together. Power shaft 3 is provided with a pair of cams 175 which are engaged by bearings 176 on arms 177 which are pivoted at 178 to arms 179 slidable in bearings 180. These arms are pivoted at 181 to links 182 attached to pivots 183 joining links 184 and 185 which form toggles. Links 184 are pivoted to housings 184' and links 185 are pivoted to ears 186 from slides 187 movable in the ways 188. Bolts 189 and nuts 190 form an adjustment for the plungers 191 which terminate in heads 192. At each revolution of shaft 3 the heads strike the ends of the flanges driving them inwardly if they should happen to be separated too great a distance due to defective welding.

After the sizing operation the spool is moved to station D, where it is transferred to the transfer rotor 2 in the following manner: referring to Figs. 31 and 32, the rotor 2 turns upon shaft 191 to which is affixed Geneva gear 9. Each disc 2 and 2' is provided with spool holders spaced 90° about their peripheries, a detail being shown in Fig. 30. As here shown a centering pin 192 is mounted on the end of a shaft 193 movable by means of a spool 194 through a rocker arm 195, shown in Figs. 31 and 32. Shaft 193 has a pair of notches 196 and 197 having inclined walls, and with which a pointed plunger 198 cooperates. This plunger is pressed by a strong spring 199 toward the notches, for a purpose to be hereinafter described.

The spools 194 may be moved by the rocker arm 195, which is pivoted at 196 to one side of shaft 191. When the upper spool (Fig. 32) is moved in, the lower one is moved out so that a spool is grasped at station D as a spool is released from station F.

Each arm 195 has an extension 197ª from their pivots 196 and these arms are pivoted at 197ᵇ to rods 197ᶜ which extend down (Fig. 2) being attached to bell crank levers 200 pivoted at 201' to brackets 201 and actuated together by rod 202. Rod 203 may be moved by bell crank lever 204 to which it is pivoted at 203, this lever being fulcrumed at 205 and having an arm attached at 206 to arm 207. Arm 207 carries a roller 208 engaging cam slot 209 (Fig. 1) of cam 210 on shaft 211 operated through bevel gears 212 and 65. Thus the rocker arms 195 move together.

Since the ends 213 of the rocker arms are elongated they slide to and from the spools 194 as the rotor 2 turns. The rocker arms, being pivoted to the frame of course remain in the same location, therefore the spools move to and from the ends 213 as the rotor moves. When the rocker arms function plunger 198 snaps into either of the notches 196 or 197. At station D the pins 192 are moved into the spool positioned between them by the main rotor 1.

The transfer rotor 2 then moves the spool to station E where the flanges are tested for strength. If improperly welded a flange is pulled off and the spool is discarded. To accomplish this the following mechanism is used: on table 215 (Fig. 1) forming part of the frame there is mounted a slide 216 (Figs. 26 to 30 inclusive) this slide moving on the dovetail track 217 and carrying a yoke 218 extending downwardly therefrom. A link 219 (Fig. 8) is pivoted to the yoke at 220 and is moved by an arm 221 pivoted at 222 to the link, at 223 to the frame and at 224 to a rod 226 moved through lever 225 on shaft 226' and having a roller 227 engaging a cam slot 228 of cam 229 on shaft 63. Column VII of the timing chart indicates this movement.

Attached to slide 216 is a spool gripper 229 consisting of jaws 230 having a snap latch which may comprise a rounded plunger 231 pressed by spring 232 into the jaws so as to just hold a spool core 24 in place. On each side of table 215 (Fig. 28) are brackets 233 supporting stripping rods 234 which pass freely through apertures 235 when the slide moves the spool gripper 229. Apertures 235 are in the form of slots permitting the breaking blocks 235' to move.

Also attached to slide 216 is an air cylinder 230' equipped with a piston head 231' and piston 232'. This piston is held normally by spring 233' in an inoperative or retracted position. The piston is attached to wedge 234' adapted to move the breaking blocks 235' upon pins 236 extending upwardly from slide 216 into slots 237. A plate 238 attached at 239 to the wedge has downwardly formed ends extending into slots 240 in the breaking blocks to move them from as well as toward each other when the piston moves.

In Fig. 33 there is a detail of the air valve used with cylinder 230'. This valve includes a body portion 241 in which the valve slide 242 is located, this being shaped like a spool having a cut away central portion 243. There is an air inlet at 244 to this chamber from supply pipe 245. The valve slide is normally held toward the right (Fig. 33) by spring 246, and is mounted upon the rod 247. This rod is provided with stops 248 and 249, one on each side a bearing 250 of brackets 251 through which the rod may slide. This bracket has a bearing 252 which may be adjusted by set screw 253 upon a rod 254 attached to bracket 255 (Fig. 1) affixed to the main frame. Obviously when slide 216 moves toward the spool, rod 247 will move also until stopped by 249 striking the bracket at which time air enters the cylinder and separates the breakers. The air pressure is set to any desired pressure, and is such that a defective weld will be detected by the flange separating from the core.

When the slide 216 moves from the rotor 2 spring 246 will move rod 247 so that the slide valve 242 will uncover vent 256 permitting air to escape about the reduced portion 243 and out through vent 257, since the spring 246 is stronger than the air pressure opposing it. Stop 248 by striking bracket 251 forms a supplementary valve trip in case spring 246 fails to function. This also cuts off the air inlet 244 as portion 258 of the valve lies directly over this opening.

If the spool is found perfect and the flanges sufficiently welded jaws 230 merely snap from the spool and it is retained on the pins of rotor 2. But if the flanges are defective the spool pins will be removed. If either or both flanges break the breakers 235 spread outwardly (impelled by wedge 234 and piston 232) so that they strike the ends 260 of shafts 193 (Fig. 30) thereby thrusting out on the shafts moving them from the position shown at P to that shown at Q and, since the distance a from the end to the notch is thus moved back to from a to b the point 198 of the plunger will be brought onto the inclined wall of notch 197 and spring 199 will then, in seating plunger 198 in notch 197 move shaft 193 to position indicated at c, in which the end 260 of the shaft 193 will lie at K. Then, the spool centering pins 192 having been withdrawn the jaws will draw the spool back with it and it may then be stripped by the stripper rods 234 after which it may fall past the baffle plate 261 (Fig. 34) so as to roll down chute 262 into the discard box 263.

It must be remembered that the rocker arms function only at stations D and F to actuate the spool centering pins and the breaker is located at station E.

If the spool has been defective the spool centering pins are moved out at station E. Consequently the spools can not move from station E to station F and slide onto the elongated end 213 of the rocker arms 195 since the ends are positioned to receive the spools from station E in their normal or spool holding position, because in the vast majority of cases the spools will be perfect and are therefore retained on the centering pins 192. We therefore provide normalizing cams 275 which lie in the paths of spools 194 and are adapted to strike the curved edges 276 (see Fig. 30) and move the spools inwardly so that the pins 192 will reach their spool holding position before reaching station F. Therefore the centering pins and spools come to station F in their normal spool holding position regardless of whether or not the breaker functions at station E.

When the spool reaches station E it has been completed and tested, and at this station it is tested for length and sorted, the spools not coming within the desired limits of accuracy being separated from the usable spools.

Referring to Figs. 34 to 40 inclusive the sizing mechanism O consists of the following mechanism. A sorter ejector arm 280 is carried by shaft 281 to which is also attached arm 282 which is pivoted to a link 283. This link is pivoted at 284 to a bell crank lever 285 which turns freely upon shaft 226' and has a pivotal connection at 286 with link 287 which carries a pin 288 extending through roller 147 which engages slot 148 of cam 149 (see Fig. 8). The timing chart in column XIV indicates the movement of the sorter ejector arm.

Figs. 38 to 40 inclusive show details of the sorter ejector arm 280 which includes a hook 290 with a detent 291. This preferably consists of a rod pressed by spring 292 into its operative spool engaging position and carrying a releasing hook 293. This hook is adapted to engage lug 294 on collar 295 which is mounted on shaft 281 but which does not turn with this shaft, being carried from bearings 297 by the bridge 298 (Fig. 37). As the hook rotates the releasing hook releases a spool when the parts reach the position shown in Fig. 39.

The ejector arm 280 grasps a spool just as the centering pins 192 are withdrawn by the rocker arms, and as the spool is released from the pins the ejector arm carries it down past the test block 299 which consists of a frame 300 mounted to turn with shaft 301 and having arms 302. One of these arms has a pad 303, and the other has a pad 304 normally held towards 303 by spring 305, this movement being limited by nuts 306 and 307. Pads 304 and 303 are carefully adjusted as to the distance between them so that a normal spool just passes between these pads, if, however, the spool is too long it will engage the pads and swing the frame 300 and with it shaft 301.

Shaft 301 carries a bell crank lever 308, one arm of which 309 is pivoted to a rod 310 carrying a weight 311, the other arm 312 being pivoted at 313 to a link 314 adapted to operate arm 315 affixed to shaft 316. This shaft carries a baffle plate 317 which also has a counterweight 318.

When the baffle 317 is in the full line position (Fig. 34) spools are directed to the drawer 319 which receives the perfect spools. If, however, the baffle has been rocked by the mechanism above described to the dash and dot line position it will direct the imperfect spools down chute 262 into tray 263.

In order to raise frame 300 after being rocked the following mechanism is used. One arm 302 carries a latch 320 pivoted at 321 and having an arm 322 held by spring 323 against lug 324. The ejector arm shaft 281 terminates at 325, and there is pinned on this end a slideway 326. This slideway turns with the arm 280. There is a latch 327 slidable through the slideway and carrying a roller 328 movable in the cam track 329 so that as arm 280 moves the latch follows substantially the path indicated by the dot and dash line Fig. 35, so that it will engage latch 320 and move frame 300 up to its full line position (Fig. 34) at which time it will slip off.

Thus it will be seen that all perfect spools pass between pads 303 and 304 without rocking the baffle so the spools drop into drawer 319, whereas, if too wide the pads will be engaged and the baffle rocked. This cares for all spools since the upsetting station with the size block precludes the possibility of any spools being too narrow.

The operation of our machine is as follows:—

A supply of spool cores 24 are placed in the hopper 18 and a supply of flanges in hoppers 83. For our preferred type of spool, as shown in Fig. 41, we prefer to supply one hopper 83 with flanges 77 having slots 79 and the other hopper 83 with flanges 77 having merely central apertures 81.

The cores 24 slide down chutes 26 and land in notches 17 of the main rotor 1. Rotor 1 is then advanced 90° by Geneva gear 10 bringing the first core to the flange applying and welding station, and at the same time a second core 24 drops in a pair of notches 17.

Flanges 77 slide down from each hopper 83 and are welded by electrodes 79 to the core, and Geneva 10 again functions, so that the first spool is moved to the bottom of the rotor, the second core to the flange applying and welding position and a third core rolls onto rotor 1.

After the pads 192 strike the flanges to size the spool for length, Geneva moves the rotor one step and the sized spool is brought to its transfer position in which position it is grasped by the centering pins 192 of the transfer rotor 2.

When rotor 2 is advanced by Geneva gear 9, the spool is brought to the spool tester 10 where the strength of the weld is determined, and if a break occurs the spool is discarded.

Another actuation of Geneva 9 moves the spool, if a good one, to the sizing station O where, if of the correct size it is placed in one receptacle, and if too long is placed into another.

From the foregoing description it will be seen that we have produced a machine which will automatically turn out all metal film spools of a predetermined length and strength.

It is to be understood that while the embodiment shown in the accompanying drawings is a preferred one, nevertheless our invention is susceptible of many different forms and we do not wish to limit ourselves to the structure shown herein, and we contemplate as within the scope of our invention all such forms as may come within the scope of the appended claims.

Having thus described our invention, what we claim as new and desire to secure by Letters Patent is:

1. In a spool making machine, an assembling station, mechanism for bringing a slotted core and a slotted flange to said station and in position for assembling with said slots in a standard angular relation, said mechanism including a stop and a device controlled by said stop for relatively rotating said spool parts through a compensating angle to bring about said standard angular relation irrespective of the initial angular relation of said spool parts in said mechanism.

2. In a spool making machine, the combination with a mechanism for feeding a slotted core, of a mechanism for feeding a slotted flange, and means for bringing the core and the flange into contact, mechanism for positioning the two slots in a definite relation one to the other.

3. In a spool making machine, the combination with a carrier, of mechanism for feeding a slotted core to the carrier, mechanism for turning the spool in the carrier to bring the slot in a definite position with respect to the carrier, a feeding mechanism for delivering a slotted flange to the carrier with the slot in a definite position, and means for uniting the core and flange with their slots in a predetermined relation to each other.

4. In a spool making machine, the combination with a carrier, of a feed mechanism for supplying slotted cores to the carrier, a righting mechanism adapted to turn a core until the slot lies in a predetermined position, a flange feeding mechanism for feeding slotted flanges to the carrier, means for uniting a flange to a core including an electrode, said electrode having means for moving the flange to the core lying on the carrier.

5. In a spool making machine, the combination with a carrier adapted to move through a predetermined path, of a core supplying station where a core having a slot is placed on the carrier, a core righting mechanism to turn the core to adjust the position of the core slot relative to the carrier, said carrier being adapted to move the core to a flange applying station, means for feeding a slotted flange toward the core, and a core and flange uniting device, adapted to move the flange from the feeding mechanism without changing the position of the flange slot and into contact with the core, said uniting device being adapted to weld the flange and core together with their slots in a predetermined relation.

6. In a spool making machine, the combination with a mechanism adapted to receive a spool core, of a mechanism adapted to feed flanges toward the core, a welding mechanism for uniting the core and flanges and an upsetting mechanism adapted to size the welded spool.

7. In a spool making machine, the combination with a mechanism adapted to weld flanges upon a core to make a spool, of mechanism operable in timed relation to the welding mechanism adapted to insure the proper positioning of the two flanges relative to each other after welding.

8. In a spool making machine, the combination with mechanism adapted to assemble a core and flanges, of a welding mechanism and a flange positioning mechanism and means for operating the last mentioned two mechanisms in timed relation, the welding mechanism being operated in advance of the positioning mechanism.

9. In a spool making machine, including a welding mechanism adapted to fasten flanges on a spool core, an upsetting mechanism for sizing the welded spool flanges including a pair of pads, a toggle mechanism for moving one of the said pads toward the other pad, and a carrier for holding the spool between the two pads.

10. In a spool making machine, including a welding mechanism adapted to fasten flanges on a spool core, a carrier for the spool, an upsetting mechanism for sizing the welded spool flanges including a pair of pads, means for moving the pads relative to each other to and from the spool flanges while the spool is held by the carrier.

11. In a spool making machine, the combination with a carrier, of means for moving the carrier with a step by step movement between stations, a core receiving and flange receiving stations, means movable in timed relation to the carrier and adapted to apply a flange to a core, means for welding the flange to the core at the flange applying station, and an upsetting station to which the spool is moved from the welding station, and a movable device for pushing one flange toward the other, said device being actuated in timed relation to the carrier to size a spool positioned on the carrier.

12. In a spool making machine, the combination with a carrier, of means for moving the carrier to a plurality of stations with an intermittent movement, a core feeding mechanism adapted to place a core on the carrier at one station, a flange feeding mechanism adapted to direct flanges to the ends of the core, a welding mechanism adapted to unite the flanges to the core at one station and mechanism located at a station near the welding station for adjusting the flange separation whereby imperfections in the location of the flanges due to welding may be corrected.

13. In a spool making machine, the combination with a carrier, of means for moving the carrier to a plurality of stations with an intermittent movement, a core feeding mechanism adapted to place a core on the carrier at one station, a flange feeding mechanism adapted to direct flanges to the ends of the core, a welding mechanism adapted to unite the flanges to the core at one station and mechanism at another station adapted to size the flanges previously welded, and mechanism at still another station adapted to test the strength of the flanges, the mechanism at all the various stations being adapted to operate in timed relation with respect to the intermittent movement of the carrier.

14. In a spool making machine, a carrier adapted to move through a predetermined path and to have a spool consisting of a core and flanges assembled thereon, means for testing the strength of the film spool including separable members adapted to enter between the flanges of the spool, and means for exerting a predetermined pressure upon the separable members whereby defective flanges will be moved with respect to the core.

15. In a spool making machine, a carrier adapted to move through a predetermined path and to have a spool consisting of a core and flanges assembled thereon, spool holders for retaining the completed spool on the carrier, a flange testing mechanism including members adapted to exert a force tending to push the flanges from each other, means for exerting a predetermined pressure on said flange testing members whereby defective flanges will be moved from the core, and means operable when a flange testing member moves a flange for automatically releasing the spool holding mechanism whereby the defective spools are released from the carrier.

16. In a spool making machine, the combination with a carrier for moving a spool to a plurality of stations, spool holding members on the carrier for holding a spool thereon, means for moving the spool holding members to an operative position to carry the spool on the carrier, a spool testing member adapted to contact with a flange and adapted to force it from the spool core if defectively united thereto, said spool testing member releasing the spool holding member to drop a defective spool from the carrier.

17. In a spool making machine, the combination with a carrier for moving a spool to a plurality of stations, spool holding members on the carrier for holding a spool thereon, means for moving the spool holding member to and from an operative or spool holding position, a spool testing device adapted to contact with the spool flanges and to exert a predetermined pressure thereon, said spool testing device also serving as a supplementary means for moving the spool holding members to an inoperative position.

18. In a spool making machine, the combination with a carrier for moving a spool to a plurality of stations, spool holding members on the carrier for holding a spool thereon, means for moving the spool holding member to and from an operative or spool holding position, a spool testing device adapted to contact with the spool flanges and to exert a predetermined pressure thereon, said spool testing device also serving as a supplementary means for moving the spool holding members to an inoperative position, and a device for returning the spool holding members to their operative position after they have been rendered inoperative by the flange testing members.

19. In a spool making machine, the combination with a carrier adapted to move past a plurality of stations, spool holding members on the carrier, and means for rendering these operative and inoperative at a spool engaging and at a spool releasing station, a testing device between the two above mentioned stations for testing the strength of the spool flanges, and means for operating the spool holding members supplementary to the receiving and releasing means at the spool receiving and releasing stations.

20. In a spool making machine, the combination with a slotted core holder, of a core turning member adapted to turn the core in the holder, and a device for retaining the core in the holder with the core slot in a definite location with respect thereto.

21. In a spool making machine, the combination with a slotted core holder, of a core turning member adapted to turn the core in the holder, a device for retaining the core in the holder with the slot in a definite location with respect to the holder, said core turning device being arranged to release the core when the slot reaches a predetermined relation with respect to the core holder.

22. In a spool making machine, the combination with a slotted core holder, of a core turning member adapted to turn the core in the holder, a device for retaining the core in the holder with the slot in a definite location by engaging the slot, said core turning device releasing said core where the slot is engaged by the device for retaining the core slot in the proper location.

23. In a spool making machine, the combination with a slotted core holder, of a core turning member adapted to turn the core in the holder by engaging the slot therein, a device for retaining the core with the slot in the desired position relative to the holder including a blade adapted to enter the slot, the turning device engaging the slot and turning the core until it is engaged by the blade, at which time the turning device releases the core, permitting it to be held in the desired position by the blade.

24. In a spool making machine, in combination a carrier for a slotted core, means for turning the core including a plunger adapted to enter the core, a core retaining blade adapted to enter the core slot where the core is turned to the proper position, means for withdrawing the core turning device, said holding blade being adapted to prevent the endwise movement of the core as the core turning mechanism is withdrawn from the core.

25. In a spool making machine, in combination a carrier for a slotted core, means for turning the core including a plunger adapted to enter the core, and having a spring adapted to engage the core slot, a blade adapted to hold the core in the desired position by engaging the spool slot, the spool being turned by the spring of the spool engaging member until the slot is engaged by the blade, said blade being adapted to stop the rotation of the spool and to cause the spring to become released from the core slot.

26. In a spool making machine, the combination with a carrier, of a device for holding a slotted spool on the carrier with the slot in a definite position, mechanism for feeding slotted flanges toward the carrier, means included in said mechanism for positioning the flange slot before it reaches the carrier, and means for welding the core and flange with their respective slots definitely positioned.

27. In a spool making machine, the combination with a carrier, of a device for holding a slotted spool on the carrier with the slot in a definite position, mechanism for feeding slotted flanges toward the carrier, a flange feeding device including a chute, means included in the chute for engaging the flange slot to position the slot relative to the carrier, and means associated with the carrier for assembling the core and flange with their respective slots in a definite relation.

28. In a spool making machine, the combination with a carrier, of a device for holding a slotted spool on the carrier with the slot in a definite position, mechanism for feeding slotted flanges having metal from the edges of the slot extending from the spool flange toward the carrier, including a chute, a groove in the chute for positioning the flanges as the sides of the slot move in the groove of the chute and means for assembling together the positioned core and flange whereby the core and the flange slot bear a definite relation one to the other.

29. In a spool making machine, the combination with a core carrier, of means for feeding flanges toward the carrier, a device for bringing the flanges into contact with the spool core, said device being adapted to unite the core and flanges to form a complete spool.

30. In a spool making machine, the combination with means for holding a core, of means for bringing flanges into contact with the ends of the core, and of means for closing an electric circuit through said core and a flange when thus held in contact to weld the flange to the core.

31. In a spool making machine, the combination with a core carrier including an electrically conducting block adapted to fit around a portion of the core, a flange feeding mechanism adapted to feed flanges toward the core, a flange applying member for moving the flange into contact with the core, an electrically conducting block adapted to fit about a portion of the core and to have electrical contact with the first mentioned block and means for moving the blocks together when the flange applying member moves a flange into contact with the core.

32. In a machine for manufacturing all-metal spools, the combination with a carrier adapted to move a spool core to a welding station, of a block for holding the core consisting of a block of electrically conducting material closely fitting a portion of the spool core, a second block also adapted to closely fit a portion of the spool core and to contact with the first mentioned block, an electrode adapted to move into contact with a flange to be welded on the spool, and means to move the blocks together and the electrode into welding position in timed relation.

33. In a machine for manufacturing all-metal film spools, the combination with a carrier adapted to move a spool core to a welding position, a two part electrode having an opening in the center adapted to receive the spool core, means for moving the carrier with an intermittent movement, means for moving one electrode block into contact with the other during a dwell in the movement of the carrier, and means for applying flanges to the core, plunger electrodes and plunger electrodes actuating means cooperating with the two part electrodes to weld the flanges on the core.

34. In a machine for making all-metal spools, the combination with a carrier, of mechanism for furnishing cores to the carrier, and intermittent power drive for the carrier, said core furnishing mechanism furnishing a core to the carrier during an interval of rest, a flange furnishing mechanism, and a flange welding mechanism, mechanism for operating the flange furnishing and welding mechanism during an interval of rest of the carrier, and means on the carrier for intermittently moving a series of cores to the flange furnishing and welding mechanism, and for intermittently moving the completed spools from this station.

35. In a machine for making all metal film spools the combination with a carrier adapted to move a spool core intermittently, of a two-part electrode adapted to embrace a spool core, one part of the electrode being included in the carrier, and the other part being movable and mounted to move to and from the carrier, mechanism adapted to move the last mentioned electrode into contact with the first mentioned electrode during a period of rest of the carrier, plunger electrodes adapted to move to and from the two part electrode and a flange feeding mechanism adapted to position flanges between the plunger and the two part electrodes whereby the plunger electrodes may carry the flanges to the core and may weld them thereto.

36. In a machine for making all-metal film spools, the combination with a carrier adapted to be moved step by step, of a spool core feeding mechanism and a flange feeding mechanism adapted to feed these parts to the carrier, means for moving the carrier from a source of power, electrodes for welding the flanges to the core, and a rotary switch for passing current to the electrodes, means for driving the electric switch intermittently from the source of power which drives the carrier.

37. In a machine for making all-metal film spools, the combination with a carrier adapted to be moved step by step, of a spool core feeding mechanism and a flange feeding mechanism adapted to feed these parts to the carrier, means for moving the carrier from a source of power, said means being adapted for moving the rotary switch during a period of dwell of the carrier.

38. In a machine for making all-metal spools, the combination with a carrier adapted to be moved step by step, of a spool core feeding mechanism and a flange feeding mechanism adapted to feed these parts to the carrier, means for moving the carrier from a source of power, through a Geneva movement, electrodes for welding the flanges to the core, a rotary switch for passing the welding current, means for driving the rotary switch intermittently, said means including a member associated with the Geneva movement operating in timed relation thereto to rotate the switch when the Geneva permits a dwell in the movement of the carrier.

39. In a machine for making all-metal film spools, the combination with a carrier adapted to be moved step by step, of a spool core feeding mechanism and a flange feeding mechanism adapted to feed these parts to the carrier, means for moving the carrier from a source of power, including a Geneva gear comprising a driving element and a star wheel, electrodes for welding the spool flanges and core, a switch for passing current to the electrodes, and means including an element driven by the driving Geneva gear element for actuating the switch to pass current during a period of rest of the carrier.

40. In a machine for making all-metal film spools, the combination with a carrier adapted to be moved step by step, of a spool core feeding mechanism and a flange feeding mechanism adapted to feed these parts to the carrier, means for moving the carrier from a source of power, including a Geneva gear comprising a driving element and a star wheel, electrodes for welding the spool flanges and core, a rotary switch for passing welding current to the electrodes, and a switch actuating member comprising a trip driven by the driving element of the Geneva gear for operating the switch, and means for adjusting the switch actuating member relative to the Geneva gear driving element.

41. In a machine for making all-metal film spools, the combination with a carrier adapted to be moved step by step, of a spool core feeding mechanism and a flange feeding mechanism adapted to feed these parts to the carrier, means for moving the carrier from a source of power, including a Geneva gear comprising a driving element and a star wheel, electrodes for welding the spool flanges and core, a rotary switch for passing welding current to the electrodes, mechanism permitting the rotary switch to turn a predetermined amount at each actuation, and means associated with the driving element of the Geneva gear for actuating the switch permitting the mechanism to turn through it predetermined amount.

42. In a machine for making all-metal film spools, the combination with a carrier, means for moving the carrier from a source of power, a core supplying mechanism adapted to feed cores to the carrier, a flange supplying mechanism for feeding flanges to the carrier, and electrodes for welding the flanges and core, and a switch mechanism for passing current to perform the welding operation, said switch mechanism including a commutator, a clutch mechanism adapted to permit the commutator to turn a limited degree when tripped, and means to trip the clutch mechanism, said trip mechanism being actuated by a member associated with the source of power which moves the carrier.

43. In a machine for making all-metal film spools, the combination with a carrier, means for moving the carrier from a source of power, a core supplying mechanism adapted to feed cores to the carrier, a flange supplying mechanism for feeding flanges to the carrier, and electrodes for welding the flanges and core, there being a block electrode and two plunger electrodes, a rotary switch for energizing said electrodes, said switch being arranged to pass current through one plunger electrode and then through the other plunger electrode, whereby the flanges may be successively welded upon the core, one after the other.

44. In a machine for making spools, the combination with a carrier, means for moving the carrier past assembling stations including a spool core, and flange supplying stations, mechanism for feeding the spool core and flanges to the carrier, means for uniting the spool core and the flanges, and a sorting station including mechanism adapted to remove the spool from the carrier, and means for delivering spools of one length in one compartment, and for delivering spools of another length in another compartment.

45. In a machine for making spools, the combination with a carrier means for moving the carrier past assembling stations including a spool core, and flange supplying stations, mechanism for feeding the spool core and flanges to the carrier, means for uniting the spool core and the flanges, and a sorting station including an ejector arm adapted to remove a spool from the carrier, releasable means for positively engaging the spool carried by the ejector arm, a sizing device, means for moving the spool by the ejector arm past the sizing device, a plurality of receptacles for different sized spools, and means for releasing the spool engaging mechanism after the spool has passed the sizing device, and means actuated through the sizing device for directing the released spool to one of the receptacles.

46. In a machine for making spools, the combination with a carrier means for moving the carrier past assembling stations including a spool core, and flange supplying stations, mechanism for feeding the spool core and flanges to the carrier, means for uniting the spool core and the flanges, and a sorting station including an ejector arm adapted to remove a spool carried by the ejector arm, a sizing device including a pair of spaced pads, means for moving the ejector arm to pass the spool between the pads, a movable baffle plate, and connections between the baffle plate and the sizing device whereby the baffle plate may be moved by the sizing device when a spool strikes a pad.

47. In a machine for making spools, the combination with a carrier means for moving the carrier past assembling stations including a spool core, and flange supplying stations, mechanism for feeding the spool core and flanges to the carrier, means for uniting the spool core and the flanges, and a sorting station including an ejector arm adapted to remove a spool carried by the ejector arm, a sizing device including a pair of spaced pads, means for moving the ejector arm to pass the spool between the pads, one pad being resiliently mounted with respect to the other pad, a movable baffle plate and connections between the baffle plate and the sizing device whereby the baffle plate will be moved by the sizing device when a spool engages the pads passing between them and pressing them apart.

48. In a machine for making and testing film spools, a plurality of stations, means for assembling and uniting spools at one station, carrier means for conveying such spools to a second station, and means at said second station for testing said spools and for ejecting imperfect spools.

49. In a machine for making and testing film spools, a plurality of stations, means for assembling and uniting spools at one station, carrier means for conveying such spools to the other stations, means at a second station for testing said spools and for ejecting imperfect spools, means at a third station for again testing the spools that were not ejected at the second station, and for ejecting those found imperfect, and for collecting together those not found imperfect.

50. In a machine for making and testing film spools, a plurality of stations, means for assembling and uniting spools at one station, carrier means for conveying such spools to a final station, means at such final station to test such spools and means for automatically directing spools found imperfect to one destination and directing spools not found imperfect to another destination.

51. In a machine for making and testing film spools, a plurality of stations, means for assembling and uniting spools at one station, carrier means for conveying such spools to the other stations, means at a second station for insuring that the flanges are spaced apart by a standard distance, means at a third station for testing the spools and for ejecting those found imperfect.

Signed at Rochester, New York this 2nd day of April, 1925.

JOHN G. JONES.
HAYWOOD G. DEWEY.